(12) United States Patent
Terry

(10) Patent No.: US 6,348,269 B1
(45) Date of Patent: Feb. 19, 2002

(54) COMPOSITION FOR PROVIDING AN ABRASION RESISTANT COATING ON A SUBSTRATE HAVING IMPROVED ADHESION AND IMPROVED RESISTANCE TO CRACK FORMATION

(75) Inventor: Karl W. Terry, Fountain Valley, CA (US)

(73) Assignee: SDC Coatings, Inc., Anaheim, CA (US)

( * ) Notice: Subject to any disclaimer, the term of this patent is extended or adjusted under 35 U.S.C. 154(b) by 0 days.

(21) Appl. No.: 09/422,530

(22) Filed: Oct. 21, 1999

Related U.S. Application Data

(60) Provisional application No. 60/105,454, filed on Oct. 23, 1998.

(51) Int. Cl.$^7$ ............................. B32B 9/04; C08G 77/04; C08G 77/20
(52) U.S. Cl. ........................... 428/447; 528/18; 528/26; 528/27; 528/31; 528/32; 528/33; 528/34
(58) Field of Search .................. 428/447; 427/387; 528/14, 15, 16, 17, 18, 19, 26, 27, 31, 32, 33, 34

(56) References Cited

U.S. PATENT DOCUMENTS 6,057,039 A * 5/2000 Takeshita et al. ........... 428/447

* cited by examiner

Primary Examiner—Robert Dawson
Assistant Examiner—Michael J Feely
(74) Attorney, Agent, or Firm—Dunlap, Codding & Rogers, P.C.

(57) ABSTRACT

Compositions having improved stability which, when applied to a variety of substrates and cured, form transparent abrasion resistant coatings having improved adhesion, and improved resistance to crack formation. The coating compositions are aqueous-organic solvent mixtures containing a mixture of hydrolysis products and partial condensates of an epoxy functional silane and a disilane and a carboxylic acid component. Substrates containing the coating compositions and a process for applying the coating composite to a substrate are also disclosed.

102 Claims, No Drawings

COMPOSITION FOR PROVIDING AN ABRASION RESISTANT COATING ON A SUBSTRATE HAVING IMPROVED ADHESION AND IMPROVED RESISTANCE TO CRACK FORMATION

CROSS REFERENCE TO RELATED APPLICATIONS

This application claims the benefit of U.S. Provisional Application Ser. No. 60/105,454, filed Oct. 23, 1998, which is hereby incorporated by reference.

STATEMENT REGARDING FEDERALLY SPONSORED RESEARCH OR DEVELOPMENT

Not Applicable.

BACKGROUND OF THE INVENTION

1. Field of the Invention

The present invention relates to coating compositions, and more particularly but not by way of limitation, to coating compositions which, when cured, provide substantially transparent abrasion resistant coatings having improved adhesion and increased stability to crack formation.

The present invention also relates to liquid coating compositions having improved stability wherein the liquid coating compositions are derived from aqueous-organic solvent mixtures containing effective amounts of epoxy functional silanes, disilanes and carboxylic acid components.

2. Description of Prior Art

The prior art is replete with compositions which, when applied to substrates and cured, provide transparent, abrasion resistant coatings for the substrates. Such coatings are especially useful for polymeric substrates where it is highly desirable to provide substrates with abrasion resistant surfaces. However, adhesion problems and crack formation can result from environmental exposure and usual processing of the coated articles. Thus, a need has long existed for improved compositions having improved stability, and which, when applied to a substrate, such as a polymeric substrate, and cured provide transparent, abrasion resistant coatings with improved adhesion and stability to crack formation. It is to such compositions and processes by which such compositions are manufactured and applied to substrates that the present invention is directed.

BRIEF SUMMARY OF THE INVENTION

The present invention provides coating compositions having improved stability which, when applied to a variety of substrates and cured, form transparent abrasion resistant coatings having improved adhesion and resistance to crack formation. Broadly, the coating compositions of the present invention comprise an aqueous-organic solvent mixture containing from about 10 to about 99.9 weight percent, based on the total solids of the composition, of a mixture of hydrolysis products and partial condensates of an epoxy functional silane, a disilane, and from about 0.01 to about 80 weight percent, based on the total weight of the composition, of a carboxylic acid functional compound selected from the group consisting of carboxylic acids, multifunctional carboxylic acids, anhydrides, and combinations thereof. The epoxy functional silane and the disilane are present in the aqueous-organic solvent mixture in a molar ratio of from about 0.05:1 to about 5:1. The coating compositions of the present invention may further include from about 0.1 to about 80 weight percent of a mixture of hydrolysis products and partial condensates of one or more silane additives, based on the total solids of the composition, and/or an amount of colloidal silica or a metal oxide or combinations thereof, equivalent to from about 0.1 to about 75 weight percent solids, based on the total solids of the composition.

It is an object of the present invention to provide coating compositions having improved stability which form transparent coatings upon curing. It is a further object of the present invention to provide stable coating compositions, which form transparent coatings upon curing having abrasion resistance, improved adhesion, and improved resistance to crack formation.

Other objects, advantages and features of the present invention will become apparent upon reading the following detailed description in conjunction with the appended claims.

DETAILED DESCRIPTION OF THE INVENTION

The present invention relates to coating compositions having improved stability which, when applied to a variety of substrates and cured, form substantially transparent abrasion resistant coatings, which provide improved adhesion and improved resistance to crack formation. For testing coated samples, coating compositions were applied to poly (diethylene glycol-bis-allyl carbonate) lenses, hereinafter referred to as ADC lenses and cured at a temperature of 110° C. for a period of 3 hours. Semi-quantitative assessments of the extent of cracking and adhesion were made using the following tests.

For testing adhesion of the coated articles the procedures of ASTM D-3359, i.e. the tape test, were followed.

A typical test for measuring the adhesion and resistance to cracking of a coating composition cured on a substrate consists of immersion of the coated article in boiling aqueous tint for a period of time, e. g. 30 minutes, followed by inspection for crack formation and testing for adhesion. Within the ophthalmic industry it is common to use such tint solutions on lenses to reduce the overall transmission of light through the lens, for example for a sunglass application. Thus, it is necessary for cured coating compositions on ophthalmic lenses not to crack or lose adhesion as a result of treatments in boiling tint. In the boiling tint test, coated and cured lenses were tested in BPI Black Tint (Brain Power, Inc.) under boiling conditions. In this test a bottle of BPI Black Tint (approximately 100 grams) was diluted to about 900 grams with tap water and brought to a boil. The coated article was immersed in the boiling solution for a period of 30 minutes. The coated article was removed from the tint solution and inspected for cracking and tested for adhesion.

For testing abrasion resistance of coated substrates, any of a number of quantitative test methods may be employed, including the Taber Test (ASTM D-4060), the Tumble Test and Standard Method for the Modified Bayer Test, which is described in The AR Council of America Standard Testing Procedures section 5.2.5 and is a variation of the test method, ASTM F735-81. In addition, there are a number of qualitative test methods that may be used for measuring abrasion resistance, including the Steel Wool Test and the Eraser Test In the Steel Wool Test and the Eraser Test, coated substrate samples are scratched under reproducible conditions (constant load, frequency, etc.). The scratched test samples are then compared and rated against standard samples. A semi-quantitative application of these test methods involves the use of an instrument, such as a Spectrophotometer or a Colorimeter, for measuring the scratches on the coated substrate as a haze gain.

The measured abrasion resistance of a cured coating on a substrate, whether measured by the Modified Bayer Test, Taber Test, Steel Wool Test, Eraser Test, Tumble Test, etc. is a function, in part, of the cure temperature and cure time. In general, higher temperatures and longer cure times result in higher measured abrasion resistance. Normally, the cure temperature and cure time are selected for compatibility with the substrate; although, sometimes less than optimum cure temperatures and cure times are used due to process and/or equipment limitations. It will be recognized by those skilled in the art that other variables, such as coating thickness and the nature of the substrate, will also have an effect on the measured abrasion resistance. In general, for each type of substrate and for each coating composition there will be an optimum coating thickness. The optimum cure temperature, cure time, coating thickness, and the like, can be readily determined empirically by those skilled in the art.

In the test method employed to determine the abrasion resistance of the coating compositions of the present invention, a commercially available alundum (grain code 1524, 12 grit, alundum ZF) sold by Norton Advanced Ceramics of Canada Inc., 8001 Daly Street, Niagra Falls, Ontario, was used as the abrasive material. In this test, 540 grams alundum was loaded into a 9 5/16"×6 3/4" cradle fitted with four lenses. Each set of four lenses, herein referred to as ADC lenses, and two coated lenses, were subjected to a 4 inch stroke (the direction of the stroke coinciding with the 9 5/16" length of the cradle) at an oscillation frequency of 300 strokes per minute for a total of 4 minutes. The lens cradle was repositioned by turning 180 degrees after the initial 2 minutes of oscillations. Repositioning of the cradle was used to reduce the impact of any inconsistencies in the oscillating mechanism. The ADC reference lenses used were Silor 70 mm plano FSV lenses, purchased through Essilor of America, Inc. of St. Petersburg, Fla. The above described procedure is slightly modified from that which is described by the AR Council of America by increasing the weight of the alundum to accommodate the increased surface area of the larger cradle. The cradle described above holds 4 lenses.

The haze generated on the lenses was then measured on a Gardner XL-835 Colorimeter. The haze gain for each lens was determined as the difference between the initial haze on the lenses and the haze after testing. The ratio of the haze gain on the ADC reference lenses to the haze gain on the coated sample lenses was then reported as the resultant abrasion resistance of the coating material. A ratio of greater than 1 indicates a coating which provides greater abrasion resistance then the uncoated ADC reference lenses. This ratio is commonly referred to as the Bayer ratio, number or value. Coating with high abrasion resistance possess larger Bayer numbers than coatings with lower abrasion resistance.

The measured adhesion, resistance to cracking and abrasion resistance of a cured coating is a function of the particular coating composition and the application and processing conditions used for the coating composition. Thus, the use of any substrate pretreatments, including the use of primers, the technique utilized for applying the coating composition on a substrate, the drying and curing conditions used for the coated article, and the resultant coating thickness, may have an affect on any or all of these properties. The optimum conditions for any particular coating composition will depend on the desired end properties of the coated and cured product, and can be determined empirically.

It should be understood that: (a) the descriptions herein of coating systems which contain epoxy functional silanes, disilanes, silane additives which do not contain an epoxy functional group, and the carboxylic acid component refer to the incipient silanes and carboxylic acid components from which the coating system is formed, (b) when the epoxy functional silanes, disilanes, and silane additives which do not contain an epoxy functional group, are combined with the aqueous-organic solvent mixture under the appropriate conditions, a hydrolysis reaction occurs resulting in partially or fully hydrolyzed species, (c) the resultant fully or partially hydrolyzed species can combine to form mixtures of multifunctional oligomeric siloxane species, (d) these oligomeric siloxane species may or may not contain pendant hydroxy and pendant alkoxy moieties and will be comprised of a silicon-oxygen matrix which contains both silicon-oxygen siloxane linkages and silicon-oxygen carboxylic acid component linkages, (e) the resultant mixtures are dynamic oligomeric suspensions that undergo structural changes which are dependent upon a multitude of factors including; temperature, pH, water content, catalyst concentration, and the like.

The coating compositions of the present invention, which desirably contains from about 1 to about 40 weight percent solids, more desirably from about 5 to about 25 weight percent solids, comprise an aqueous-organic solvent mixture containing from about 10 to about 99.9 weight percent, based on the total solids of the composition, of a mixture of hydrolysis products and partial condensates of an epoxy functional silane and a disilane and from about 0.01 to about 80 weight percent, based on the total weight of the composition, of a compound selected from the group consisting of carboxylic acids, multifunctional carboxylic acids, anhydrides, and combinations thereof. The amount of epoxy functional silane and the amount of disilane employed can vary widely and will generally be dependent upon the properties desired in the coating composition and the cured coating, as well as the end use of the substrate to which the coating composition is applied. Generally, however, desirable results can be obtained where the epoxy functional silane and the disilane are present in the aqueous-organic solvent mixture in a molar ratio of from about 0.05:1 to about 5:1. More desirably, the epoxy functional silane and the disilane are present in the aqueous-organic solvent mixture in a molar ratio of from about 0.1:1 to about 3:1.

While the presence of water in the aqueous-organic solvent mixture is necessary to form hydrolysis products of the silane components of the mixture, the actual amount can vary widely. Essentially enough water is needed to provide a substantially homogeneous coating mixture of hydrolysis products and partial condensates of the alkoxy functional silanes (i.e., the epoxy functional silane, the disilane and other silane components) which, when applied and cured on an article, provides a substantially transparent abrasion resistant coating. Such coatings can be obtained by employing an amount of water required for the hydrolysis of the sum of the hydrolyzable alkoxy groups on the alkoxy silane components in the coating mixture. It is preferred that the amount of water used for hydrolysis will range from about 0.5 to about 15 moles of water for each hydrolyzable alkoxy group. The abrasion resistance of the coated article is affected by the concentration of water in the incipient coating composition. The most significant affect of water concentration on abrasion resistance is seen at low water concentrations, e.g., at a stoichiometric concentration of water, which generally results in a reduction in the abrasion resistance of the coated and cured product relative to similar compositions prepared at greater than stoichiometric concentrations of water. The abrasion resistance for coating compositions prepared at low concentrations of water, however, can be increased by the use of a condensation catalyst. In general, a condensation catalyst will increase the abrasion resistance of coating compositions prepared at both low and high concentrations of water; however, the increase in abrasion resistance is greatest for those coating compositions prepared at low concentrations of water. The effective amount of water and the effective amount and type of condensation catalyst can be determined empirically.

The solvent constituent of the aqueous-organic solvent mixture of the coating compositions of the present invention can be any solvent or combination of solvents which is compatible with the epoxy functional silane, the disilane, and the carboxylic acid component. For example, the solvent constituent of the aqueous-organic solvent mixture may be an alcohol, an ether, a glycol or a glycol ether, a ketone, an ester, a glycolether acetate and mixtures thereof Suitable alcohols can be represented by the formula ROH where R is an alkyl group containing from 1 to about 10 carbon atoms. Some examples of alcohols useful in the application of this invention are methanol, ethanol, propanol, isopropanol, butanol, isobutanol, secondary butanol, tertiary butanol, cyclohexanol, pentanol, octanol, decanol, and mixtures thereof.

Suitable glycols, ethers, and glycol ethers can be represented by the formula $R^1$-$(OR^2)_x$-$OR^1$: where x is an integer of 0, 1, 2, 3, or 4; $R^1$ is selected from the group consisting of H or an alkyl group containing from 1 to about 10 carbon atoms; and $R^2$ is independently selected from the group consisting of an alkene group and a multivalent saturated hydrocarbon group, wherein $R^2$ contains from 1 to about 10 carbon atoms.

Examples of glycols, ethers and glycol ethers having the above-defined formula and which may be used as the solvent constituent of the aqueous-organic solvent mixture of the coating compositions of the present invention are di-n-butylether, ethylene glycol dimethyl ether, propylene glycol dimethyl ether, propylene glycol methyl ether, dipropylene glycol methyl ether, tripropylene glycol methyl ether, dipropylene glycol dimethyl ether, tripropylene glycol dimethyl ether, ethylene glycol butyl ether, diethylene glycol butyl ether, ethylene glycol dibutyl ether, ethylene glycol methyl ether, diethylene glycol ethyl ether, diethylene glycol dimethyl ether, ethylene glycol ethyl ether, ethylene glycol diethyl ether, ethylene glycol, diethylene glycol, triethylene glycol, propylene glycol, dipropylene glycol, tripropylene glycol, butylene glycol, dibutylene glycol, tributylene glycol and mixtures thereof. In addition to the above, cyclic ethers such as tetrahydrofuran and dioxane are suitable ethers for the aqueous-organic solvent mixture.

Examples of ketones suitable for the aqueous-organic solvent mixture are acetone, diacetone alcohol, methyl ethyl ketone, cyclohexanone, methyl isobutyl ketone and mixtures thereof.

Examples of esters suitable for the aqueous-organic solvent mixture are ethyl acetate, n-propyl acetate, n-butyl acetate and combinations thereof.

Examples of glycol ether acetates suitable for the aqueous-organic solvent mixture are propylene glycol methyl ether acetate, dipropylene glycol methyl ether acetate, ethyl 3-ethoxypropionate, ethylene glycol ethyl ether acetate and combinations thereof.

The epoxy functional silane useful in the formulation of the coating compositions of the present invention, can be any epoxy functional silane which is compatible with the disilane and the carboxylic acid component of the coating composition, and which provides a coating composition which, upon curing, produces a substantially transparent, abrasion resistant coating which exhibits improved adhesion and improved resistance to crack formation. Generally, such epoxy functional silanes are represented by the formula $R^3_x Si(OR^4)_{4-x}$: where x is an integer of 1, 2, or 3; $R^3$ is independently selected from the group consisting of H, an alkyl group, a functionalized alkyl group, an alkene group, an aryl group, and an alkyl ether group, wherein $R^3$ comprises from 1 to about 10 carbon atoms when $R^3$ is not H, and wherein at least one $R^3$ comprises an epoxy functional group; $R^4$ is independently selected from the group consisting of H, an alkyl group containing from 1 to about 5 carbon atoms, an acetyl group, a —$Si(OR^5)_{3-y}R^6_y$ group: where y is an integer of 0, 1, 2, or 3; $R^5$ is independently selected from the group consisting of H, an alkyl group containing from 1 to about 5 carbon atoms, an acetyl group, and another —$Si(OR^5)_{3-y}R^6_y$ group; $R^6$ is independently selected from the group consisting of H, an alkyl group, a functionalized alkyl group, an alkene group, an aryl group, and an alkyl ether group, wherein $R^6$ comprises from 1 to about 10 carbon atoms when $R^6$ is not H. alkyl group, a functionalized alkyl group, an alkylene group, an aryl group, an alkyl ether, and combinations thereof containing from 1 to about 10 carbon atoms and having at least 1 epoxy functional group, and $R^4$ is H, an alkyl group containing from 1 to about 5 carbon atoms, an acetyl group, a —$Si(OR^5)_{3-y}R^6_y$ group where y is an integer of 0, 1, 2, or 3, and combinations thereof where $R^5$ is H, an alkyl group containing from 1 to about 5 carbon atoms, an acetyl group, or another —$Si(OR^5)_{3-y}R^6_y$ group and combinations thereof, and $R^6$ is H, an alkyl group, a functionalized alkyl group, an alkylene group, an aryl group, an alkyl ether, and combinations thereof containing from 1 to about 10 carbon atoms which may also contain an epoxy functional group.

Examples of such epoxy functional silanes are glycidoxymethyltrimethoxysilane, 3-glycidoxypropyltrihydroxysilane, 3-glycidoxypropyldimethylhydroxysilane, 3-glycidoxypropyltrimethoxysilane, 3-glycidoxypropyltriethoxysilane, 3-glycidoxypropyldimethoxymethylsilane, 3-glycidoxypropyldimethylmethoxysilane, 3-glycidoxypropyltributoxysilane, 1,3-bis(glycidoxypropyl) tetra-methyldisiloxane, 1,3-bis(glycidoxypropyl) tetramethoxydisiloxane, 1,3-bis(glycidoxypropyl)-1,3-dimethyl-1,3-dimethoxydisiloxane, 2,3-epoxypropyltrimethoxysilane, 3,4-epoxybutyltrimethoxysilane, 6,7-epoxyheptyltrimethoxysilane, 9,10-epoxydecyltrimethoxysilane, 1,3-bis(2,3-epoxypropyl) tetramethoxydisiloxane, 1,3-bis(6,7-epoxy-heptyl) tetramethoxydisiloxane, 2-(3,4-epoxycyclohexyl) ethyltrimethoxysilane, and the like.

The disilane additives useful in the coating compositions of the present invention have the formula $(R^7O)_x R^8_{3-x} Si$—$R^9_y$-$SiR^{10}_{3-x}$-$(OR^{11})_x$: where x is 0, 1, 2, or 3; y is 0 or 1; $R^8$ and $R^{10}$ are independently selected from the group consisting of H, Cl, Br, an alkyl group containing from about 1 to 10 carbon atoms, a functionalized alkyl group, an alkene group, an aryl group, and an alkylpolyether group; $R^7$ and $R^{11}$ are selected from the group consisting of H, an alkyl group containing form about 1 to 10 carbon atoms, and an acetyl group; where y is 1, $R^9$ is selected from the group consisting of an alkene group containing from about 1 to 12 carbon atoms, an multivalent saturated hydrocarbon group containing from about 1 to 12 carbon atoms, an alkylenepolyether containing from about 1 to 12 carbon atoms, an aryl group, an alkene substituted aryl group, an alkene group which may contain one or more olefins, O or S; where x is 0, $R^8$ and $R^{10}$ are selected from the group consisting of Cl and Br; and where y is 0, a direct silicon-silicon bond is provided. alkylene group, an aryl group, an alkylpolyether group and combinations thereof; $R^7$ and $R^{11}$ are H, an alkyl group containing from about 1 to 10 carbon atoms, an acetyl group, and combinations thereof. If y is 1 then $R^9$ can be an alkylene group containing from about 1 to 12 carbon atoms, an alkylenepolyether containing from about 1 to 12 carbon atoms, an aryl group, an alkylene substituted 5 aryl group, an alkylene group which may contain one or more olefins, or an oxygen or sulfur. If x=0, then $R^8$ and $R^{10}$ are Cl or Br; and if y=0, there is a direct silicon-silicon bond.

Examples of disilanes satisfying the above defined formula include bis(triethoxysilyl)ethane, bis(triethoxysilyl) methane, bis(trichlorosilyl)propane, bis(triethoxysilyl) ethylene, 1,3 bistriethoxysilylethane, hexaethoxydisiloxane, hexaethoxydisilane.

The coating compositions of the present invention may contain any carboxylic acid compatible with the epoxy functional silane and the disilane of the coating compositions and which is capable of interacting with the hydrolysis products and partial condensates of the epoxy functional silane and the disilane to provide stability to the coating composition which, upon curing, produces a substantially transparent, abrasion resistant coating having improved adhesion and improved crack resistance.

The carboxylic acid functional compound as used herein is understood to include mono- and multi-functional carboxylic acids as well as anhydrides which produce mono- and multifunctional carboxylic acids. The carboxylic acid functional group is represented by the formula $R^{12}(COOR^{13})_x$: where x is an integer of 1, 2, 3, or 4; $R^{12}$ is selected from the group consisting of H, an alkyl group, a functionalized alkyl group, an alkene group, a multivalent saturated hydrocarbon group, an aryl group, a functionalized aryl group, and an alkyl ether group, wherein $R^{12}$ comprises from 1 to about 10 carbon atoms when $R^{12}$ is not H; $R^{13}$ is independently selected from the group consisting of H, a formyl group, a carbonyl group, or an acyl group, wherein the acyl group can be functionalized with an alkyl group, a functionalized alkyl group, an alkene group, an aryl, a functionalized aryl group, and an alkyl ether group, wherein $R^{13}$ comprises from 1 to about 10 carbon atoms when $R^{13}$ is not H. Examples of carboxylic acids which can be employed in the preparation of the coating compositions of the present invention included acetic acid, acrylic acid, methacrylic acid, formic acid, propionic acid, butanoic acid, malic acid, aconitic acid (cis, trans), itaconic acid, succinic acid, malonic acid, glutaric acid, adipic acid, pimelic acid, suberic acid, azalaic acid, sebacic acid, cyclohexyl succinic acid, 1,3,5 benzene tricarboxylic acid, 1,2,4,5 benzene tetracarboxylic acid, 1,4-cyclohexanedicarboxylic acid, 1,3-cyclohexanedicarboxylic acid, 1,1-cyclohexanediacetic acid, 1,3-cyclohexanedicarboxylic acid, 1,1-cyclohexanediacetic acid, 1,3-cyclohexanediacetic acid, 1,3,5-cyclohexanetricarboxylic acid and unsaturated dibasic acids such as fumaric acid and maleic acid and combinations thereof.

Examples of anhydrides which can be employed to produce the carboxylic acid component of the coating compositions of the present invention include the anhydrides of the above mentioned carboxylic acids such as acetic anhydride, propionic anhydride, acrylic anhydride, methacrylic anhydride and the cyclic anhydrides of the above mentioned dibasic acids such as succinic anhydride, itaconic anhydride, glutaric anhydride, trimellitic anhydride, pyromellitic anhydride, phthalic anhydride and maleic anhydride and combinations thereof.

Optionally, in addition to the carboxylic acid component of the coating composition, a mineral acid such as, for example, hydrochloric acid or nitric acid, can be used as a co-hydrolysis catalyst for the hydrolysis of the silane compounds described herein.

The coating compositions of the present invention are also stable with respect to aging, both in terms of performance and solution stability. The aging of the coating compositions is characterized by a gradual increase in viscosity, which eventually renders the coating compositions unusable due to processing constraints. The coating compositions of the present invention, when stored at temperatures of 5° C. or lower have usable shelf lives of at least 3 months. During this period, the abrasion resistance of the cured coatings does not significantly decrease with time. Further, studies have shown that the stability of the coating compositions is dependent on the relative concentrations of the epoxy functional silane, the disilane and the carboxylic acid component. In general, higher concentrations of the epoxy functional silane and the carboxylic acid component relative to the disilane component contribute to increased stability of the coating mixture. Thus, in addition to providing enhanced abrasion resistance to the cured coatings, the carboxylic acid component contributes to the overall stability of the coating compositions.

The improvements in adhesion and resistance to crack formation for the abrasion resistant coating compositions of the present invention are achieved through the unique combination of an epoxy functional silane, a disilane and a carboxylic acid component. The coating compositions may optionally include other materials which may: (a) enhance the stability of the coating compositions; (b) increase the abrasion resistance of cured coatings produced by the coating compositions; (c) improve processing of the coating compositions; and (d) provide other desirable properties to the coating compositions and the cured products of the coating compositions.

The coating compositions of the present invention may further include from 0.1 to about 80 weight percent, based on the weight of total solids of the coating compositions, of a mixture of hydrolysis products and partial condensates of one or more silane additives (i.e. tetrafunctional silanes, trifunctional silanes, difunctional silanes, monofunctional silanes, and mixtures thereof). The silane additives which can be incorporated into the coating compositions of the present invention can be represented by the formula $R^{14}_x Si(OR^{15})_{4-x}$: where x in an integer of 0, 1, 2, or 3; $R^{14}$ is independently selected from the group consisting of H, an alkyl group containing from 1 to about 10 carbon atoms, a functionalized alkyl group, an alkene group, an aryl group, and an alkyl ether group; and $R^{15}$ is independently selected from the group consisting of H, an alkyl group containing from 1 to about 10 carbon atoms, an acetyl group, and a —Si(OR$^{14}$)$_3$ group.

Examples of silane additives represented by the above-defined formula are methyltrimethoxysilane, ethyltrimethoxysilane, propyltrimethoxysilane, butyltrimethoxysilane, isobutyltrimethoxysilane, hexyltrimethoxysilane, octyltrimethoxy-silane, decyltrimethoxysilane, cyclohexyltrimethoxysilane, cyclohexylmethyltrimethoxysilane, 3-methacryloxypropyltrimethoxysilane, vinyltrimethoxysilane, allyltrimethoxysilane, dimethyldimethoxysilane, 2-(3-cyclohexenyl) ethyltrimethoxysilane, 3-cyanopropyl-trimethoxysilane, 3-chloropropyltrimethoxysilane, 2-chloroethyltrimethoxysilane, phenethyltrimethoxysilane, 3-mercaptopropyl-trimethoxysilane, 3-aminopropyltrimethoxysilane, phenyltrimethoxysilane, 3-isocyanopropyltrimethoxysilane, N-(2-aminoethyl)-3-aminopropyltrimethoxysilane, 4-(2-aminoethylaminomethyl)phenethyltrimethoxysilane, chloromethyltriethoxysilane, 2-chloro-ethyltriethoxysilane, 3-chloropropyltriethoxysilane, phenyl-triethoxysilane, ethyltriethoxysilane, propyltriethoxysilane, butyltriethoxysilane, isobutyltriethoxysilane, hexyltriethoxy-silane, octyltriethoxysilane, decyltriethoxysilane, cyclohexyl-triethoxysilane, cyclohexylmethyltriethoxysilane, 3-methacryloxy-propyltriethoxysilane, vinyltriethoxysilane, allyltriethoxysilane, 2-3-cyclohexenylethyltriethoxysilane, 3-cyanopropyltriethoxysilane, 3-methacrylamidopropyltriethoxysilane, 3-methoxypropyl-trimethoxysilane, 3-ethoxypropyltrimethoxysilane, 3-propoxypropyltrimethoxysilane, 3-methoxyethyltrimethoxysilane, 3-ethoxyethyltrimethoxysilane, 3-propoxyethyltrimethoxysilane, 2-[methoxy-(polyethyleneoxy)propyl]heptamethyltrisiloxane, [methoxy (poly-ethyleneoxy)propyl]trimethoxysilane, [methoxy (polyethyleneoxy)ethyl]trimethoxysilane, [methoxy (polyethyleneoxy)propyl]triethoxysilane, [methoxy (polyethyleneoxy)ethyl]triethoxysilane, tetramethyl orthosilicate, tetraethyl orthosilicate, tetrapropyl orthosilicate, tetraisopropyl orthosilicate, tetrabutyl orthosilicate, tetraisobutyl orthosilicate, tetrakis (methoxyethoxy)silane, tetrakis(methoxypropoxy)silane, tetrakis(ethoxyethoxy)silane, tetrakis (methoxyethoxyethoxy)silane, trimethoxyethoxysilane, dimethoxydiethoxysilane, triethoxymethoxysilane, poly (dimethoxysiloxane), poly(diethoxysiloxane), poly (dimethoxydiethoxysiloxane), tetrakis(trimethoxysiloxy) silane, tetrakis(triethoxysiloxy)silane, and the like.

When x=0, $R^{15}$ may also be an acyl group to yield a carboxylate group. Examples of tetrafunctional silanes with carboxylate groups are silicon tetracetate, silicon tetrapropionate and silicon tetrabutyrate.

The selection of the silane additive, as well as the amount of such silane additive incorporated into the coating compositions will depend upon the particular properties to be enhanced or imparted to either the coating composition or the cured coating composition. For example, when a tetrafunctional silane (e.g., tetraethyl orthosilicate) is utilized as the silane additive and incorporated into a coating composition in accordance with the present invention, the abrasion resistance is greatly enhanced while maintaining the beneficial properties of adhesion and resistance to crack formation.

In certain applications, it is useful to add colloidal silica to the coating composition. Colloidal silica is commercially available under a number of different tradename designations, including Nalcoag® (Nalco Chemical Co., Naperville, Ill.); Nyacol® (Nyacol Products, Inc., Ashland, Mass.); Snowtex® (Nissan Chemical Industries, LTD., Tokyo, Japan); Ludox® (DuPont Company, Wilmington, Del.); and Highlink OG® (Hoechst Celanese, Charlotte, N.C.). The colloidal silica is an aqueous or organic solvent dispersion of particulate silica and the various products differ principally by particle size, silica concentration, pH, presence of stabilizing ions, solvent makeup, and the like. It should be noted that substantially different product properties can be obtained through the selection of different colloidal silicas.

Colloidal silica, when added to a coating composition, is considered a reactive material. The surface of the silica is covered with silicon bound hydroxyls, some of which are deprotonated, which can interact with materials in the coating composition of the present invention The extent of these interactions is dictated by a variety of factors, including solvent system, pH, concentration, and ionic strength. The manufacturing process further affects these interactions. Thus colloidal silica can be added into a coating formulation in different ways with different results.

It has been observed that the addition of colloidal silica to the coating compositions of the present invention can further enhance the abrasion resistance of the cured coating compositions and can further contribute to the overall stability of the coating compositions. The most significant results have been achieved with the use of aqueous basic colloidal silica, that is, aqueous mixtures of colloidal silica having a pH greater than 7. In such cases, the high pH is accompanied by a higher concentration of a stabilizing counterion, such as the sodium cation. Cured coatings formulated from the coating compositions of the present invention which contain basic colloidal silicas show improved abrasion resistance and stability.

In the same manner, it is possible to add other metal oxides into the coating compositions of the present invention. Such additions may be made instead of, or in addition to, any colloidal silica additions. Metal oxides may be added to the inventive coatings to provide or enhance specific properties of the cured coating, such as abrasion resistance, refractive index, anti-static, anti-reflectance, weatherability, etc. It will be recognized by those skilled in the art that similar types of considerations that apply to the colloidal silica additions will also apply more generally to the metal oxide additions.

Examples of metal oxides which may be used in the coating compositions of the present invention include silica, zirconia, titania, ceria, tin oxide, antimony oxide, iron oxide, and mixtures thereof.

The amount of colloidal silica incorporated into the coating compositions of the present invention can vary widely and will generally depend on the desired properties of the coating composition and the cured coating produced therefrom. Similarly, the amount of metal oxides incorporated into the coating compositions of the present invention can vary widely and will generally depend on the desired physical and optical properties of the cured coating produced from the coating compositions, as well as the desired stability of the coating compositions.

When colloidal silica and/or metal oxides are incorporated into the coating compositions of the present invention, it is desirable to add from about 0.1 to about 75 weight percent based on the total weight of solids, of the colloidal silica and/or metal oxides. The colloidal silica and/or metal oxides will generally have a particle size in the range of 2 to 150 millimicrons in diameter, and more desirably, a particle size in the range of from about 2 to 50 millimicrons.

Although a condensation catalyst is not an essential ingredient of the coating compositions of the present invention, the addition of a condensation catalyst can affect adhesion, resistance to cracking, abrasion resistance and other properties of the coating including stability, tinting capacity, porosity, cosmetics, caustic resistance, water resistance and the like. When employing a condensation catalyst, the amount of catalyst used can vary widely, but will generally be present in an amount from about 0.05 to about 20 weight percent, based on the total solids of the composition.

Examples of catalysts which can be incorporated into the coating compositions of the present invention are (i) metal acetylacetonates, (ii) diamides, (iii) imidazoles, (iv) amines and ammonium salts, (v) organic sulfonic acids and their amine salts, (vi) alkali metal salts of carboxylic acids, (vii) alkali metal hydroxides, (viii) fluoride salts, and (ix) organostannanes. Thus, examples of such catalysts include for group (i) such compounds as aluminum, zinc, iron and cobalt acetylacetonates; group (ii) dicyandiamide; for group (iii) such compounds as 2-methylimidazole, 2-ethyl-4-methylimidazole and 1-cyanoethyl-2-propylimidazole; for group (iv), such compounds as benzyldimethylamine, and 1,2-dianinocyclohexane; for group (v), such compounds as trifluoromethanesulfonic acid; for group (vi), such compounds as sodium acetate, for group (vii), such compounds as sodium hydroxide, and potassium hydroxide, for group (viii), tetra n-butyl ammonium fluoride, and for group (ix), dibutyltin dilaurate, and the like.

An effective amount of a leveling or flow control agent can be incorporated into the composition to more evenly spread or level the composition on the surface of the substrate and to provide substantially uniform contact with the substrate. The amount of the leveling or flow control agent can vary widely, but generally is an amount sufficient to provide the coating composition with from about 10 to about 50,000 ppm of the leveling or flow control agent. Any conventional, commercially available leveling or flow control agent which is compatible with the coating composition and the substrate and which is capable of leveling the coating composition on a substrate and which enhances wetting between the coating composition and the substrate can be employed. The use of leveling and flow control agents is well known in the art and has been described in the "Handbook of Coating Additives" (ed. Leonard J. Calbo, pub. Marcel Dekker), pg. 119–145.

Examples of such leveling or flow control agents which can be incorporated into the coating compositions of the present invention include organic polyethers such as TRITON X-100, X-405, N-57 from Rohm and Haas, silicones such as Paint Additive 3, Paint Additive 29, Paint Additive 57 from Dow Corning, SILWET L-77, and SILWET L-7600 from OSi Specialties, and fluorosurfactants such as FLUORAD FC-171, FLUORAD FC-430 and FLUORAD FC-431 from 3M Corporation.

In addition, other additives can be added to the coating compositions of the present invention in order to enhance the usefulness of the coating compositions or the coatings produced by curing the coating compositions. For example, ultraviolet absorbers, antioxidants, and the like can be incorporated into the coating compositions of the present invention, if desired.

The coating compositions of the present invention can be prepared by a variety of processes to provide stable coating compositions, which, upon curing, produce substantially transparent abrasion resistant coatings having improved adhesion and resistance to crack formation. For example, the epoxy functional silane, the disilane and the carboxylic acid component can be added to the aqueous-organic solvent solution and stirred for a period of time effective to produce a coating composition having improved stability. When cured, such abrasion resistant coating compositions have improved adhesion and increased stability to crack formation when employing the test methods hereinbefore described. However, by incorporating a condensation catalyst into the aqueous-organic solvent mixtures containing the epoxy functional silane, the disilane and the carboxylic acid components, the Bayer numbers of the cured coatings produced from such coating compositions generally increase indicating a more abrasion resistant coating.

The preferred method for preparing the coating compositions of the present invention consists of the initial hydrolysis of the epoxy functional silane by addition of the silane to deionized water. This is followed by an addition of a solution of the carboxylic acid component in the solvent constituent. The disilane is then added to the above mixture and stirred for a sufficient period of time to allow hydrolysis of the disilane. When a silane additive is used in combination with the disilane compound and the epoxy functional silane, the order of addition will be dependent on the nature of the silane additive. The mode of addition of the silane additive with respect to the disilane and/or the epoxy functional silane, e.g., as a mix or by sequential addition, may be used to influence the final properties of the coating composition and the cured product therefrom. When desired a colloidal metal oxide and/or a condensation catalyst and/or a surfactant for leveling and flow improvement may be added to the final coating composition.

The coating compositions of the present invention can be applied to solid substrates by conventional methods, such as flow coating, spray coating, curtain coating, dip coating, spin coating, roll coating, etc. to form a continuous surface film. Any substrate compatible with the compositions can be coated with the compositions, such as plastic materials, wood, paper, metal, printed surfaces, leather, glass, ceramics, glass ceramics, mineral based materials and textiles. The compositions are especially useful as coatings for synthetic organic polymeric substrates in sheet or film form, such as acrylic polymers, polyethyleneterephthalate, polycarbonates, polyamides, polyimides, copolymers of acrylonitrile-styrene, styrene-acrylonitrile-butadiene copolymers, polyvinyl chloride, butyrates, polyethylene and the like. Transparent polymeric materials coated with these compositions are useful as flat or curved enclosures, such as windows, liquid crystal display screens, skylights and windshields, especially for transportation equipment. Plastic lenses, such as acrylic or polycarbonate ophthalmic lenses, can also be coated with the compositions of the invention By choice of proper formulation, application conditions and pretreatment (including the use of primers) of the substrate, the coating compositions of the present invention can be adhered to substantially all solid surfaces. Abrasion resistant coatings having improved adhesion and resistance to cracking can be obtained from coating compositions of the present invention by heat curing at temperatures in the range of from about 50° C. to about 200° C. for a period of from about 5 minutes to about 18 hours. The coating thickness can be varied by means of the particular application technique, but coatings having a thickness of from about 0.5 to about 20 microns, and more desirably from about 1 to about 10 microns, are generally utilized.

In order to further illustrate the present invention, the following examples are given. However, it is to be understood that the examples are for illustrative purposes only and are not to be construed as limiting the scope of the subject invention.

EXAMPLES

Procedures

Procedure A

Etched poly(diethylene glycol-bis-allyl carbonate) lenses and plaques (referred to as ADC lenses or ADC plaques)

were used for coating and testing. The ADC lenses and plaques were etched by contact with a 10% potassium hydroxide solution of 1:1 by weight propylene glycol methyl ether and water for a period of about 10 minutes. The lenses and/or plaques were coated by dip coating using a specified withdrawal rate in units of inches per minute (ipm). The coated lenses and/or plaques were cured at a temperature of 110° C. for 3 hours. The cured coated lenses and/or plaques were subjected to the aforementioned test procedures to determine adhesion, resistance to cracking and abrasion resistance.

Example 1A 110.0 grams of 3-glycidoxypropyltrimethoxysilane (GPTMS) were added dropwise to 281.5 grams of deionized water while stirring. The aqueous GPTMS mixture was stirred for approximately 1.5 hours. A solution containing 281.5 grams of isopropyl alcohol (IPA) and 15.2 grams of acetic acid (AcOH) was added rapidly to the aqueous GPTIS mixture. After stirring for 2 hours, 411.8 grams of bis (triethoxysilyl)ethane (BSE) were added dropwise to the stirring mixture. The resulting mixture was stirred overnight to produce a coating composition, which possessed a pH value of approximately 4.2. The coating composition was applied to the etched ADC lenses according to procedure A, at a withdrawal rate of 6 ipm, to provide a cured coating having a thickness of about 1.9 microns and a Bayer number of 2.4. The data showing adhesion and resistance to cracking is summarized in Table 1.

Example 1B 0.12 grams of benzyldimethylamine (BDMA) were added to 380 grams of the coating composition in Example 1A to yield a composition with a pH value of 5.1. After stirring for about 3 hours, the coating composition was applied to the etched ADC lenses according to procedure A, at a withdraw rate of 6 ipm, to provide a cured coating having a thickness of about 2.3 microns and a Bayer number of 3.2. The data showing adhesion and resistance to cracking is summarized in Table 1.

Example 1C 0.8 grams of IN NaOH were added to 380 grams of the coating composition in Example 1A to yield a composition with a pH value of 5.1. After stirring for about 3 hours, the coating composition was applied to the etched ADC lenses according to procedure A, at a withdraw rate of 6 ipm, to provide a cured coating having a thickness of about 2.3 microns and a Bayer number of 4.0. The data showing adhesion and resistance to cracking is summarized in Table 1.

Example 2A 43.5 grams of GPTMS were added dropwise to 95.7 grams deionized water while stirring. The aqueous mixture was stirred for approximately 1.25 hours. A solution containing 95.7 grams of IPA and 6.0 grams of AcOH was added rapidly to the aqueous GPTMS mixture. After stirring for 1.5 hours, a stirred mixture of 107.4 grams of BSE and 31.6 grams of tetraethyl orthosilicate (TEOS) was added dropwise to the stirring mixture. The resulting mixture was stirred overnight to produce a coating composition. 0.18 grams of FC-430 (3M) were added to the coating composition to aid with flow and leveling. The resulting coating composition was stirred for an additional hour. The final pH value of the composition was approximately 4.2. The coating composition was applied to the etched ADC lenses according to procedure A, at a withdrawal rate of 2 ipm, to provide a cured coating having a thickness of about 2.2 microns and a Bayer number of 3.3. The data showing adhesion and resistance to cracking is summarized in Table 1.

Example 2B 0.1 grams of BDMA were added to 180 grams of the coating composition in Example 2A to yield a composition with a pH value of 5.1. After stirring for about 3 hours, the coating composition was applied to the etched ADC lenses according to procedure A, at a withdraw rate of 2 ipm, to provide a cured coating having a thickness of about 2.4 microns and a Bayer number of 3.7. The data showing adhesion and resistance to cracking is summarized in Table 1.

Example 2C 52.6 grams of GPTMS were added dropwise to 71.0 grams deionized water while stirring. The aqueous mixture was stirred for approximately 4 hours. A solution containing 100.8 grams of IPA and 7.3 grams of AcOH was added rapidly to the aqueous GPTMS mixture. After stirring for 1.5 hours, a stirred mixture of 46.9 grams of BSE and 73.6 grams of TEOS was added dropwise to the stirring mixture. After stirring overnight 27.8 grams of Nalco 1115 colloidal silica were added to the above mixture by rapid pouring. The resulting mixture was stirred overnight to produce a coating composition. 0.38 grams of FC-430 (3M) were added to the coating composition to aid with flow and leveling. The resulting coating composition was stirred for an additional hour. The coating composition was applied to the etched ADC lenses according to procedure A, at a withdrawal rate of 2 ipm, to provide a cured coating having a thickness of about 3.6 microns and a Bayer number of 6.6.

Example 3A 107.9 grams of GPTMS were added dropwise to 286.0 grams of deionized water while stirring. The aqueous mixture was stirred for approximately 1.5 hours. A solution containing 286.0 grams of IPA and 16.2 grams of itaconic acid (ITA) was added rapidly to the aqueous GPTMS mixture. After stirring for 2 hours, 404.0 grams of BSE were added dropwise to the stirring mixture. The resulting mixture was stirred overnight to produce a coating composition, which possessed a pH value of approximately 3.9. The coating composition was applied to the etched ADC lenses according to procedure A, at a withdraw rate of 6 ipm, to provide a cured coating having a thickness of about 2.5 microns and a Bayer number of 2.5. The data showing adhesion and resistance to cracking is summarized in Table 1.

Example 3B 0.9 grams of BDMA were added to 380 grams of the coating composition in Example 3A to yield a composition with a pH value of 5.1. After stirring for about 3 hours, the coating composition was applied to the etched ADC lenses according to procedure A, at a withdraw rate of 6 ipm, to provide a cured coating having a thickness of about 2.3 microns and a Bayer number of 5.1. The data showing adhesion and resistance to cracking is summarized in Table 1.

Example 3C 2.4 grams of 1N NaOH were added to 380 grams of the coating composition in Example 3A to yield a composition with a pH value of 5.1. After stirring for about 3 hours, the coating composition was applied to the etched ADC lenses according to procedure A, at a withdraw rate of 6 ipm, to provide a cured coating having a thickness of about 1.9 microns and a Bayer number of 5.7. The data showing adhesion and resistance to cracking is summarized in Table 1.

Example 3D 18.4 grams of GPTMS were added dropwise to 36.7 grams deionized water while stirring. The aqueous mixture was stirred for approximately 3 hours. A solution containing 52.1 grams of IPA and 2.8 grams of ITA was added rapidly to the aqueous GPTMS mixture. After stirring for 30 minutes, 60.2 grams of BSE were added dropwise to the stirring mixture. After stirring overnight 9.7 grams of Nalco 1115 colloidal silica were added to the above mixture by rapid pouring. The resulting mixture was stirred overnight to produce a coating composition. 0.18 grams of FC-430 (3M) were added to the coating composition to aid with flow and leveling. The resulting coating composition was stirred for an additional hour. The coating composition was applied to the etched ADC lenses according to procedure A, at a withdrawal rate of 2 ipm, to provide a cured coating having a thickness of about 2.6 microns and a Bayer number of 5.8.

Example 4A 43.2 grams of GPTMS were added dropwise to 101.1 grams of a 0.05 N solution of HCl in deionized water while stirring. The aqueous mixture was stirred for approximately 30 minutes. A solution containing 101.1 grams of IPA and 6.5 grams of itaconic acid (ITA) was added rapidly to the aqueous GPTMS mixture. After stirring for 30 minutes, a stirred mixture of 106.7 grams of BSE and 31.4 grams of TEOS was added dropwise to the stirring mixture. The resulting mixture was stirred overnight to produce a coating composition. 0.38 grams of FC-430 (3M) were added to the coating composition to aid with flow and leveling. The resulting coating composition was stirred for an additional hour. The final pH value of the composition was approximately 3.7. The coating composition was applied to the etched ADC lenses according to procedure A, at a withdraw rate of 2 ipm, to provide a cured coating having a thickness of about 3.4 microns and a Bayer number of 3.5. The data showing adhesion and resistance to cracking is summarized in Table 1.

Example 4B 1.1 grams of BDMA were added to 380 grams of the coating composition in Example 4A to yield a composition with a pH value of 5.1. After stirring for about 3 hours, the coating composition was applied to the etched ADC lenses according to procedure A, at a withdraw rate of 2 ipm, to provide a cured coating having a thickness of about 2.5 microns and a Bayer number of 8.1. The data showing adhesion and resistance to cracking is summarized in Table 1.

Example 5A 43.2 grams of GPTMS were added dropwise to 101.1 deionized water while stirring. The aqueous mixture was stirred for approximately 4 hours. A solution containing 101.1 grams of IPA and 6.5 grams of itaconic acid (ITA) was added rapidly to the aqueous GPTMS mixture. After stirring for 1.5 hours, a stirred mixture of 106.7 grams of BSE and 31.4 grams of TEOS was added dropwise to the stirring mixture. The resulting mixture was stirred overnight to produce a coating composition. 0.38 grams of FC-430 (3M) were added to the coating composition to aid with flow and leveling. The resulting coating composition was stirred for an additional hour. The final pH value of the composition was approximately 3.7. The coating composition was applied to the etched ADC lenses according to procedure A, at a withdraw rate of 2 ipm, to provide a cured coating having a thickness of about 3.4 microns and a Bayer number of 3.5. The data showing adhesion and resistance to cracking is summarized in Table 1.

Example 5B 1.1 grams of BDMA were added to 380 grams of the coating composition in Example 5A to yield a composition with a pH value of 5.1. After stirring for about 3 hours, the coating composition was applied to the etched ADC lenses according to procedure A, at a withdraw rate of 2 ipm, to provide a cured coating having a thickness of about 2.5 microns and a Bayer number of 5.9. The data showing adhesion and resistance to cracking is summarized in Table 1.

Example 5C 49.1 grams of GPTMS were added dropwise to 80.6 grams deionized water while stirring. The aqueous mixture was stirred for approximately 3 hours. A solution containing 114.5 grams of IPA and 7.4 grams of ITA was added rapidly to the aqueous GPTMS mixture. After stirring for 30 minutes, a stirred mixture of 43.8 grams of BSE and 68.6 grams of TEOS was added dropwise to the stirring mixture. After stirring overnight 26.0 grams of Nalco 1115 colloidal silica was added to the above mixture by rapid pouring. The resulting mixture was stirred overnight to produce a coating composition. 0.39 grams of FC-430 (3M) were added to the coating composition to aid with flow and leveling. The resulting coating composition was stirred for an additional hour. The coating composition was applied to the etched ADC lenses according to procedure A, at a withdrawal rate of 2 ipm, to provide a cured coating having a thickness of about 2.3 microns and a Bayer number of 9.1. The data showing adhesion and resistance to cracking is summarized in Table 1.

Example 5D 43.3 grams of GPTMS were added dropwise to 82.1 grams deionized water while stirring. The aqueous mixture was stirred for approximately 4.5 hours. A solution containing 116.6 grams of IPA and 6.5 grams of ITA was added rapidly to the aqueous GPTMS mixture. After stirring for 1.5 hours, a stirred mixture of 85.1 grams of BSE and 33.4 grams of TEOS was added dropwise to the stirring mixture. After stirring overnight 22.9 grams of Nalco 1115 colloidal silica were added to the above mixture by rapid pouring. The resulting mixture was stirred overnight to produce a coating composition. 0.39 grams of FC-430 (3M) were added to the coating composition to aid with flow and leveling. The resulting coating composition was stirred for an additional hour. The coating composition was applied to the etched ADC lenses according to procedure A, at a withdrawal rate of 2 ipm, to provide a cured coating having a thickness of about 2.3 microns and a Bayer number of 8.8. The data showing adhesion and resistance to cracking is summarized in Table 1.

Example 5E 44.1 grams of GPTMS were added dropwise to a stirring solution of 103.0 grams of deionized water, 127.8 grams of PM-glycol ether (PMOH), and 6.1 grams of ITA. The above aqueous-organic mixture was stirred for approximately 2 hours. To this mixture 52.9 grams of BSE and 20.7 grams of TEOS were added dropwise to the above stirring mixture. After stirring overnight, a 12.5 gram slug of Ludox HS-30 (Du Pont) was added to the above mixture by rapid pouring. The resultant mixture as stirred for four hours followed by the addition of a 24.9 gram slug of 1115 (Nalco) by rapid pouring. The resulting mixture was stirred overnight to produce a coating composition. 0.29 grams of FC-430 (3M) were added to the coating composition to aid with flow and leveling. The resulting coating composition was stirred for an additional 3 hours. The coating composition was applied to etched ADC lenses according to procedure A, at a withdraw rate of 2 ipm, to provide a cured coating having a thickness of 1.9 microns and a Bayer number 10.4.

Example 6

1976 grams of GPTMS were added slowly to 33 82 grams of deionized water while stirring. The aqueous GPTMS mixture was stirred overnight. 296 grams of ITA dissolved in 3501 grams of IPA were added streamwise to the above mixture. The mixture was stirred for an additional thirty minutes, followed by slow addition of 3801 grams of TEOS. After stirring overnight, 1045 grams of Nalco 1115 were added to the above mixture by rapid pouring. The resulting mixture was stirred overnight to produce a coating composition. 10.5 grams of FC-430 (3M) were added to the coating composition to aid with flow and leveling. The resulting coating composition was stirred for an additional hour. The coating composition was applied to the etched ADC lenses according to procedure A at a withdrawal rate of 4 ipm, to provide a cured coating having a thickness of 2.6 microns and a Bayer number of 8.5.

TABLE 1*

| C = Cracking<br>N = No Cracking<br>(% adhesion) | Boiling Tint<br>Test |
|---|---|
| 1A | C (100%) |
| 1B | N (100%) |
| 1C | N (100%) |
| 2A | C (100%) |
| 2B | N (100%) |
| 3A | N (100%) |
| 3B | N (100%) |
| 3C | N (100%) |
| 4A | C (100%) |
| 4B | N (100%) |
| 5A | C (100%) |
| 5B | N (100%) |
| 5C | N (100%) |
| 5D | N (100%) |
| 5E | N (100%) |
| 6 | C (100%) |

*The adhesion and crazing are also dependent on the age of the coating material before application onto the substrate and the pH and ionic strength of the tint bath and the thickness of the cured coating on the substrate.

The above data clearly indicates that by using a disilane in combination with an epoxy functional silane and a carboxylic acid component and various optional materials such as silane additives, co-hydrolysis catalysts, condensation catalysts, colloidal metal oxides including silica, one can improve either the adhesion, the resistance to cracking or the abrasion resistance of the cured coating compositions, and by manipulation of these components may improve any or all of the above described properties. For example, the data indicated that coating compositions having improved abrasion resistance as indicated by the Bayer number measured on such coating compositions can be achieved when one employs a multifunctional carboxylic acid as a component of the coating composition rather than a monofuctional carboxylic acid.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A composition having improved stability and which, when applied to a substrate and cured, provides an abrasion resistant coating on the substrate having improved adhesion and increased stability to crack formation, comprising: an aqueous-organic solvent mixture containing hydrolysis products and partial condensates of an epoxy functional silane, a disilane, and a carboxylic acid compound, wherein the disilane is represented by the formula $(R^7O)_xR^8_{3-x}Si$—$R^9_y$—$SiR^{10}_{3-x}(OR^{11})_x$: where x is 0, 1, 2, or 3; y is 0 or 1; $R^8$ and $R^{10}$ are independently selected from the group consisting of H, Cl, Br, an alkyl group containing from about 1 to 10 carbon atoms, a functionalized alkyl group, an alkene group, an aryl group, and an alkylpolyether group; $R^7$ and $R^{11}$ are selected from the group consisting of H, an alkyl group containing form about 1 to 10 carbon atoms, and an acetyl group; where y is 1, $R^9$ is selected from the group consisting of an alkene group containing from about 1 to 12 carbon atoms, an multivalent saturated hydrocarbon group containing from about 1 to 12 carbon atoms, an alkylenepolyether containing from about 1 to 12 carbon atoms, an aryl group, an alkene substituted aryl group, an alkene group which may contain one or more olefins, O or S; where x is 0, $R^8$ and $R^{10}$ are selected from the group consisting of Cl and Br; and where y is 0, a direct silicon-silicon bond is provided; wherein the carboxylic acid functional compound is selected from the group consisting of monofunctional carboxylic acids, multifunctional carboxylic acids, multifunctional anhydrides an combinations thereof; and wherein the epoxy functional silane is present in a molar ratio to the disilane of from about 0.05:1 to about 5:1.

2. The composition of claim 1 wherein the hydrolysis products and partial condensates of the epoxy functional silane and the disilane are present in the aqueous-organic solvent mixture in an amount of from about 10 to about 99.9 weight percent, based on the total solids of the coating composition and wherein the carboxylic acid functional compound is present in the aqueous-organic solvent mixture in an amount of from about 0.1 to about 80 weight percent, based on the total weight of the coating composition.

3. The composition of claim 2 wherein the solvent constituent of the aqueous-organic solvent mixture is selected from the group consisting of an alcohol, an ether, a glycol, a glycol ether, an ester, a ketone, a glycolether acetate and mixtures thereof.

4. The composition of claim 1 wherein the solvent constituent of the aqueous-organic solvent mixture is an alcohol having the general formula ROH where R is an alkyl group containing from 1 to about 10 carbon atoms.

5. The composition of claim 1 wherein the solvent constituent of the aqueous-organic solvent mixture is selected from the group consisting of a glycol, an ether, a glycol ether and mixtures thereof having the formula $R^1$—$(OR^2)_x$—$OR^1$: where x is an integer of 0, 1, 2, 3, or 4; $R^1$ is selected from the group consisting of H or an alkyl group containing from 1 to about 10 carbon atoms; and $R^2$ is independently selected from the group consisting of an alkene group and a multivalent saturated hydrocarbon group, wherein $R^2$ contains from 1 to about 10 carbon atoms.

6. The composition of claim 1 wherein the epoxy functional silane is present in a molar ratio to the disilane of from about 0.1:1 to about 3:1.

7. The composition of claim 1 wherein the epoxy functional silane is represented by the formula $R^3_x Si(OR^4)_{4-x}$: where x is an integer of 1, 2, or 3; $R^3$ is independently selected from the group consisting of H, an alkyl group, a functionalized alkyl group, an alkene group, an aryl group, and an alkyl ether group, wherein $R^3$ comprises from 1 to about 10 carbon atoms when $R^3$ is not H, and wherein at least one $R^3$ comprises an epoxy functional group; $R^4$ is independently selected from the group consisting of H, an alkyl group containing from 1 to about 5 carbon atoms, an acetyl group, a $Si(OR^5)_{3-y} R^6_y$ group: where y is an integer of 0, 1, 2, or 3; $R^5$ is independently selected from the group consisting of H, an alkyl group containing from 1 to about 5 carbon atoms, an acetyl group, and another —$Si(OR^5)_{3-y} R^6_y$ group; $R^6$ is independently selected from the group consisting of H, an alkyl group, a functionalized alkyl group, an alkene group, an aryl group, and an alkyl ether group, wherein $R^6$ comprises from 1 to about 10 carbon atoms when $R^6$ is not H.

8. The composition of claim 1 wherein the carboxylic acid functional compound is represented by the formula $R^{12}(COOR^{13})_x$: where x is an integer of 1, 2, 3, or 4; $R^{12}$ is selected from the group consisting of H, an alkyl group, a functionalized alkyl group, an alkene group, a multivalent saturated hydrocarbon group, an aryl group, a functionalized aryl group, and an alkyl ether group, wherein $R^{12}$ comprises from 1 to about 10 carbon atoms when $R^{12}$ is not H; $R^{13}$ is independently selected from the group consisting of H, a formyl group, a carbonyl group, or an acyl group, wherein the acyl group can be functionalized with an alkyl group, a functionalized alkyl group, an alkene group, an aryl, a functionalized aryl group, and an alkyl ether group, wherein $R^{13}$ comprises from 1 to about 10 carbon atoms when $R^{13}$ is not H.

9. The composition of claim 1 wherein the amount of water present in the aqueous-organic solvent mixture is an amount sufficient to provide a substantially homogeneous mixture of hydrolysis products and partial condensates of the epoxy functional silane and the disilane.

10. The composition of claim 9 wherein at least a portion of the solvent component of the aqueous-organic solvent mixture is generated during the hydrolysis of these epoxy functional silane and the disilane.

11. The composition of claim 9 wherein the aqueous-organic solvent mixture further comprises an effective amount of co-hydrolysis catalyst to enhance the hydrolysis rates of the hydrolyzable components.

12. The composition of claim 1 wherein the aqueous-organic solvent mixture further comprises an effective amount of a catalyst to provide enhanced abrasion resistance to a coating produced by curing the composition.

13. The composition of claim 12 wherein the effective amount of the catalyst is from about 0.1 to about 10 weight percent, based on the total solids of the composition.

14. The composition of claim 1 wherein the aqueous-organic solvent mixture further comprises an effective amount of a leveling agent to spread the aqueous-organic solvent mixture on the substrate and provide substantially uniform contact of the aqueous-organic solvent mixture with the substrate.

15. The composition of claim 1 wherein the aqueous-organic solvent mixture further comprises form about 0.1 to about 50 weight percent, based on the total solids of the composition, of a mixture of hydrolysis products and partial condensates of a silane additive represented by the formula $R^{14}_x Si(OR^{15})_{4-x}$: where x in an integer of 0, 1, 2, or 3; $R^{14}$ is independently selected from the group consisting of H, an alkyl group containing from 1 to about 10 carbon atoms, a functionalized alkyl group, an alkene group, an aryl group, and an alkyl ether group; and $R^{15}$ is independently selected from the group consisting of H, an alkyl group containing from 1 to about 10 carbon atoms, and an acetyl group.

16. The composition of claim 1 wherein the amount of water present in the aqueous-organic solvent mixture is an amount sufficient to provide a substantially homogeneous mixture of hydrolysis products and partial condensates of the epoxy functional silane, the disilane, and the silane additive.

17. The composition of claim 16 wherein at least a portion of the solvent component of the aqueous-organic solvent mixture is generated during the hydrolysis of the epoxy functional silane and the disilane.

18. The composition of claim 16 wherein the aqueous-organic solvent mixture further comprises an effective amount of co-hydrolysis catalyst to enhance the hydrolysis rates of the silane components.

19. The composition of claim 16 wherein the aqueous-organic solvent mixture further comprises an effective amount of a catalyst to provide enhanced abrasion resistance to a coating produced by curing the composition.

20. The composition of claim 19 wherein the effective amount of the catalyst is from about 0.1 to about 10 weight percent, based on the total solids of the composition.

21. The composition of claim 1 wherein the aqueous-organic solvent mixture further comprises an effective amount of a leveling agent to spread the aqueous-organic solvent mixture on the substrate and provide substantially uniform contact of the aqueous-organic solvent mixture with the substrate.

22. The composition of claim 1 wherein the aqueous-organic solvent mixture further comprises an effective amount of colloidal silica to provide the composition with from about 0.1 to about 50 weight percent silica, based on the total of solids present in the composition.

23. The composition of claim 22 wherein the amount of water present in the aqueous-organic solvent mixture is an amount sufficient to provide a substantially homogeneous mixture of the colloidal silica and the hydrolysis products and partial condensates of the epoxy functional silane and the disilane.

24. The composition of claim 23 wherein at least a portion of the solvent component of the aqueous-organic solvent mixture is generated during the hydrolysis of the epoxy functional silane and the disilane.

25. The composition of claim 24 wherein the aqueous-organic solvent mix further comprises an effective amount of a catalyst to provide enhanced abrasion resistance to the coating produced by curing the aqueous-organic solvent mixture.

26. The composition of claim 25 wherein the effective amount of catalyst present in the aqueous-organic solvent mixture is from about 0.1 to about 10 weight percent, based on the total solids of the aqueous-organic solvent mixture.

27. The composition claim 22 wherein the aqueous-organic solvent mixture further comprises an effective amount of a leveling agent to spread the aqueous-organic solvent mixture on the substrate and provide substantially uniform contact of the aqueous-organic solvent mixture with the substrate.

28. The composition of claim 1 wherein the aqueous-organic solvent mixture comprises: from about 0.1 to about 50 weight percent, based on the total solids of the composition, of a mixture of hydrolysis product and partial condensates of a silane additive represented by the formula $R^{14}_x Si(OR^{15})_{4-x}$: where x is an integer of 0, 1, 2, or 3; $R^{14}$ is independently selected from the group consisting of H, an alkyl group containing from 1 to about 10 carbon atoms, a functionalized alkyl group, an alkene group, an aryl group, and an alkyl ether group; $R^{15}$ is independently selected from group consisting of H, an alkyl group containing from 1 to about 10 carbon atoms, and an acetyl group; and an effective amount of colloidal silica to provide the composition with from about 0.1 to about 50 weight percent silica, based on the total of solids present in the composition.

29. The composition of claim 28 wherein the amount of water present in the aqueous-organic solvent mixture is an amount sufficient to provide a substantially homogeneous mixture of hydrolysis products and partial condensates of the epoxy functional silane, disilane, and silane additive.

30. The composition of claim 29 wherein at least a portion of the solvent component of the aqueous-organic solvent mixture is generated during the hydrolysis of the epoxy functional silane the disilane, and the silane additive.

31. The composition of claim 30 wherein the aqueous-organic solvent mixture further comprises an effective amount of co-hydrolysis catalyst to enhance the hydrolysis rates of the hydrolyzable components.

32. The composition of claim 31 wherein the aqueous-organic solvent mixture further comprises an effective amount of a catalyst to provide enhanced abrasion resistance to the coating produced by curing the aqueous solvent mixture.

33. The composition of claim 32 wherein the effective amount of catalyst present in the aqueous-organic solvent mixture is from about 0.1 to about 10 weight percent, based on the total solids of the aqueous-organic solvent mixture.

34. The composition of claim 28 wherein the aqueous-organic solvent mixture further comprises an effective amount of a leveling agent to spread the aqueous-organic solvent mixture on the substrate and provide substantially uniform contact of the aqueous-organic solvent mixture with the substrate.

35. An article comprising: a substrate; and a substantially transparent abrasion resistant coating having improved adhesion and increased stability to crack formation formed on at least on surface of the substrate wherein the coating is formed by curing a coating composition comprising an aqueous-organic solvent mixture containing hydrolysis products and partial condensates of an epoxy functional silane, a disilane, and a carboxylic acid compound wherein the disilane is represented by the formula $(R^7O)_x R^8_{3-x} Si—R^9_y SiR^{10}_{3-x}(OR^{11})_x$: where x is 0, 1, 2, or 3; y is 0 or 1; $R^8$ and $R^{10}$ are independently selected from the group consisting of H, Cl, Br, an alkyl group containing from about 1 to 10 carbon atoms, a functionalized alkyl group, an alkene group, an aryl group, and an alkylpolyether group; $R^7$ and $R^{11}$ are selected from the group consisting of H, an alkyl group containing form about 1 to 10 carbon atoms, and an acetyl group; where y is 1, $R^9$ is selected from the group consisting of an alkene group containing from about 1 to 12 carbon atoms, an multivalent saturated hydrocarbon group containing from about 1 to 12 carbon atoms, an alkylenepolyether containing from about 1 to 12 carbon atoms, an aryl group, an alkene substituted aryl group, an alkene group which may contain one or more olefins, O or S; where x is 0, $R^8$ and $R^{10}$ are selected from the group consisting of Cl and Br; and where y is 0, a direct silicon-silicon bond is provided; wherein the carboxylic acid functional compound is selected from the group consisting of monofunctional carboxylic acids, multifunctional carboxylic acids, multifunctional anhydrides an combinations thereof; and wherein the epoxy functional silane is present in a molar ratio to the disilane of from about 0.05:1 to about 5:1.

36. The article of claim 35 wherein the hydrolysis products and partial condensates of the epoxy functional silane and the disilane are present in the aqueous-organic solvent mixture in an amount of from about 10 to about 99.9 weight percent, based on the total solids of the coating composition and wherein the carboxylic acid functional compound is present in the aqueous-organic solvent mixture in an amount of from about 0.1 to about 80 weight percent, based on the total weight of the coating composition.

37. The article of claim 36 wherein the solvent constituent of the aqueous-organic solvent mixture is selected from the group consisting of an alcohol, an ether, a glycol, a glycol ether, an ester, a ketone, a glycolether acetate and mixtures thereof.

38. The article of claim 35 wherein the solvent constituent of the aqueous-organic solvent mixture is an alcohol having the general formula ROH where R is an alkyl group containing from 1 to about 10 carbon atoms.

39. The article of claim 35 wherein the solvent constituent of the aqueous-organic solvent mixture is selected from the group consisting of a glycol, an ether, a glycol ether and mixtures thereof having the formula $R^1—(OR^2)_x—OR^1$: where x is an integer of 0, 1, 2, 3, or 4; $R^1$ is selected from the group consisting of H or an alkyl group containing from 1 to about 10 carbon atoms; and $R^2$ is independently selected from the group consisting of an alkene group and a multivalent saturated hydrocarbon group, wherein $R^2$ contains from 1 to about 10 carbon atoms.

40. The article of claim 35 wherein the epoxy functional silane is present in a molar ratio to the disilane of from about 0.1:1 to about 3:1.

41. The article of claim 35 wherein the epoxy functional silane is represented by the formula $R^3_x Si(OR^4)_{4-x}$: where x is an integer of 1, 2, or 3; $R^3$ is independently selected from the group consisting of H, an alkyl group, a functionalized alkyl group, an alkene group, an aryl group, and an alkyl ether group, wherein $R^3$ comprises from 1 to about 10 carbon atoms when $R^3$ is not H, and wherein at least one $R^3$ comprises an epoxy functional group; $R^4$ is independently selected from the group consisting of H, an alkyl group containing from 1 to about 5 carbon atoms, an acetyl group, a $Si(OR^5)_{3-y} R^6_y$ group: where y is an integer of 0, 1, 2, or 3; $R^5$ is independently selected from the group consisting of H, an alkyl group containing from 1 to about 5 carbon atoms, an acetyl group, and another $—Si(OR^5)_{3-y} R^6_y$ group; $R^6$ is independently selected from the group consisting of H, an alkyl group, a functionalized alkyl group, an alkene group, an aryl group, and an alkyl ether group, wherein $R^6$ comprises from 1 to about 10 carbon atoms when $R^6$ is not H.

42. The article of claim 35 wherein the carboxylic acid functional compound is represented by the formula $R^{12}(COOR^{13})_x$: where x is an integer of 1, 2, 3, or 4; $R^{12}$ is selected from the group consisting of H, an alkyl group, a functionalized alkyl group, an alkene group, a multivalent saturated hydrocarbon group, an aryl group, a functionalized aryl group, and an alkyl ether group, wherein $R^{12}$ comprises from 1 to about 10 carbon atoms when $R^{12}$ is not H; $R^{13}$ is independently selected from the group consisting of H, a formyl group, a carbonyl group, or an acyl group, wherein the acyl group can be functionalized with an alkyl group, a functionalized alkyl group, an alkene group, an aryl, a functionalized aryl group, and an alkyl ether group, wherein $R^{13}$ comprises from 1 to about 10 carbon atoms when $R^{13}$ is not H.

43. The article of claim 35 wherein the amount of water present in the aqueous-organic solvent mixture is an amount sufficient to provide a substantially homogeneous mixture of hydrolysis products and partial condensates of the epoxy functional silane and the disilane.

44. The article of claim 43 wherein at least a portion of the solvent component of the aqueous-organic solvent mixture is generated during the hydrolysis of the epoxy functional silane and the disilane.

45. The article of claim 43 wherein the aqueous-organic solvent mixture further comprises an effective amount of co-hydrolysis catalyst to enhance the hydrolysis rates of the hydrolyzable components.

46. The article of claim 35 wherein the aqueous-organic solvent mixture further comprises an effective amount of a catalyst to provide enhanced abrasion resistance to a coating produced by curing the composition.

47. The article of claim 46 wherein the effective amount of the catalyst is from about 0.1 to about 10 weight percent, based on the total solids of the composition.

48. The article of claim 35 wherein the aqueous-organic solvent mixture further comprises an effective amount of a leveling agent to spread the aqueous-organic solvent mixture on the substrate and provide substantially uniform contact of the aqueous-organic solvent mixture with the substrate.

49. The article of claim 35 wherein the aqueous-organic solvent mixture further comprises form about 0.1 to about 50 weight percent, based on the total solids of the composition, of a mixture of hydrolysis products and partial condensates of a silane additive represented by the formula $R^{14}_x Si(OR^5)_{4-x}$: where x in an integer of 0, 1, 2, or 3; $R^{14}$ is independently selected from the group consisting of H, an alkyl group containing from 1 to about 10 carbon atoms, a functionalized alkyl group, an alkene group, an aryl group, and an alkyl ether group; and $R^{15}$ is independently selected from the group consisting of H, an alkyl group containing from 1 to about 10 carbon atoms, and an acetyl group.

50. The article of claim 49 wherein the amount of water present in the aqueous-organic solvent mixture is an amount sufficient to provide a substantially homogeneous mixture of hydrolysis products and partial condensates of the epoxy functional silane, the disilane, and the silane additive.

51. The article of claim 50 wherein at least a portion of the solvent component of the aqueous-organic solvent mixture is generated during the hydrolysis of the epoxy functional silane and the disilane.

52. The article of claim 50 wherein the aqueous-organic solvent mixture further comprises an effective amount of co-hydrolysis catalyst to enhance the hydrolysis rates of the silane components.

53. The article of claim 50 wherein the aqueous-organic solvent mixture further comprises an effective amount of a catalyst to provide enhanced abrasion resistance to a coating produced by curing the composition.

54. The article of claim 53 wherein the effective amount of the catalyst is from about 0.1 to about 10 weight percent, based on the total solids of the composition.

55. The article of claim 49 wherein the aqueous-organic solvent mixture further comprises an effective amount of a leveling agent to spread the aqueous-organic solvent mixture on the substrate and provide substantially uniform contact of the aqueous-organic solvent mixture with the substrate.

56. The article of claim 35 wherein the aqueous-organic solvent mixture further comprises an effective amount of colloidal silica to provide the composition with from about 0.1 to about 50 weight percent silica, based on the total of solids present in the composition.

57. The article of claim 56 wherein the amount of water present in the aqueous-organic solvent mixture is an amount sufficient to provide a substantially homogeneous mixture of the colloidal silica and the hydrolysis products and partial condensates of the epoxy functional silane and the disilane.

58. The article of claim 57 wherein at least a portion of the solvent component of the aqueous-organic solvent mixture is generated during the hydrolysis of the epoxy functional silane and the disilane.

59. The article of claim 58 wherein the aqueous-organic solvent mixture further comprises an effective amount of a catalyst to provide enhanced abrasion resistance to the coating produced by curing the aqueous-organic solvent mixture.

60. The article of claim 59 wherein the effective amount of catalyst present in the aqueous-organic solvent mixture is from about 0.1 to about 10 weight percent, based on the total solids of the aqueous-organic solvent mixture.

61. The article claim 56 wherein the aqueous-organic solvent mixture further comprises an effective amount of a leveling agent to spread the aqueous-organic solvent mixture on the substrate and provide substantially uniform contact of the aqueous-organic solvent mixture with the substrate.

62. The article of claim 35 wherein the aqueous-organic solvent mixture comprises: from about 0.1 to about 50 weight percent, based on the total solids of the composition, of a mixture of hydrolysis product and partial condensates of a silane additive represented by the formula $R^{14}_x Si(OR^{15})_{4-x}$: where x is an integer of 0, 1, 2, or 3; $R^{14}$ is independently selected from the group consisting of H, an alkyl group containing from 1 to about 10 carbon atoms, a functionalized alkyl group, an alkene group, an aryl group, and an alkyl ether group; $R^{15}$ is independently selected from group consisting of H, an alkyl group containing from 1 to about 10 carbon atoms, and an acetyl group; and an effective amount of colloidal silica to provide the composition with from about 0.1 to about 50 weight percent silica, based on the total of solids present in the composition.

63. The article of claim 62 wherein the amount of water present in the aqueous-organic solvent mixture is an amount sufficient to provide a substantially homogeneous mixture of hydrolysis products and partial condensates of the epoxy functional silane, disilane, and silane additive.

64. The article of claim 63 wherein at least a portion of the solvent component of the aqueous-organic solvent mixture is generated during the hydrolysis of the epoxy functional silane the disilane, and the silane additive.

65. The article of claim 64 wherein the aqueous-organic solvent mixture further comprises an effective amount of co-hydrolysis catalyst to enhance the hydrolysis rates of the hydrolyzable components.

66. The article of claim 65 wherein the aqueous-organic solvent mixture further comprises an effective amount of a catalyst to provide enhanced abrasion resistance to the coating produced by curing the aqueous solvent mixture.

67. The article of claim 66 wherein the effective amount of catalyst present in the aqueous-organic solvent mixture is from about 0.1 to about 10 weight percent, based on the total solids of the aqueous-organic solvent mixture.

68. The article of claim 62 wherein the aqueous-organic solvent mixture further comprises an effective amount of a leveling agent to spread the aqueous-organic solvent mixture on the substrate and provide substantially uniform contact of the aqueous-organic solvent mixture with the substrate.

69. A process for providing a substantially transparent abrasion resistant coating having improved adhesion and increased stability to crack formation, comprising: applying to at least one surface of a substrate an effective amount of an aqueous-organic solvent mixture containing hydrolysis products and partial condensates of an epoxy functional silane, a disilane, and a carboxylic acid compound wherein the disilane is represented by the formula $(R^7O)_R{}^8{}_{3-x}Si—R^9{}_y—SiR^{10}{}_{3-x}(OR^{11})_x$: where x is 0, 1, 2, or 3; y is 0 or 1; $R^8$ and $R^{10}$ are independently selected from the group consisting of H, Cl, Br, an alkyl group containing from about 1 to 10 carbon atoms, a functionalized alkyl group, an alkene group, an aryl group, and an alkylpolyether group; $R^7$ and $R^{11}$ are selected from the group consisting of H, an alkyl group containing form about 1 to 10 carbon atoms, and an acetyl group; where y is 1, $R^9$ is selected from the group consisting of an alkene group containing from about 1 to 12 carbon atoms, an multivalent saturated hydrocarbon group containing from about 1 to 12 carbon atoms, an alkylenepolyether containing from about 1 to 12 carbon atoms, an aryl group, an alkene substituted aryl group, an alkene group which may contain one or more olefins, O or S; where x is 0, $R^8$ and $R^{10}$ are selected from the group consisting of Cl and Br; and where y is 0, a direct silicon-silicon bond is provided; wherein the carboxylic acid functional compound is selected from the group consisting of monofunctional carboxylic acids, multifunctional carboxylic acids, multifunctional anhydrides an combinations thereof; and wherein the epoxy functional silane is present in a molar ratio to the disilane of from about 0.05:1 to about 5:1.

70. The process of claim 69 wherein the hydrolysis products and partial condensates of the epoxy functional silane and the disilane are present in the aqueous-organic solvent mixture in an amount of from about 10 to about 99.9 weight percent, based on the total solids of the coating composition and wherein the carboxylic acid functional compound is present in the aqueous-organic solvent mixture in an amount of from about 0.1 to about 80 weight percent, based on the total weight of the coating composition.

71. The process of claim 70 wherein the solvent constituent of the aqueous-organic solvent mixture is selected from the group consisting of an alcohol, an ether, a glycol, a glycol ether, an ester, a ketone, a glycolether acetate and mixtures thereof.

72. The process of claim 69 wherein the solvent constituent of the aqueous-organic solvent mixture is an alcohol having the general formula ROH where R is an alkyl group containing from 1 to about 10 carbon atoms.

73. The process of claim 69 wherein the solvent constituent of the aqueous-organic solvent mixture is selected from the group consisting of a glycol, an ether, a glycol ether and mixtures thereof having the formula $R^1—(OR^2)_x—OR^1$: where x is an integer of 0, 1, 2, 3, or 4; $R^1$ is selected from the group consisting of H or an alkyl group containing from 1 to about 10 carbon atoms; and $R^2$ is independently selected from the group consisting of an alkene group and a multivalent saturated hydrocarbon group, wherein $R^2$ contains from 1 to about 10 carbon atoms.

74. The process of claim 69 wherein the epoxy functional silane is present in a molar ratio to the disilane of from about 0.1:1 to about 3:1.

75. The process of claim 69 wherein the epoxy functional silane is represented by the formula $R^3{}_xSi(OR^4)_{4-x}$: where x is an integer of 1, 2, or 3; $R^3$ is independently selected from the group consisting of H, an alkyl group, a functionalized alkyl group, an alkene group, an aryl group, and an alkyl ether group, wherein $R^3$ comprises from 1 to about 10 carbon atoms when $R^3$ is not H, and wherein at least one $R^3$ comprises an epoxy functional group; $R^4$ is independently selected from the group consisting of H, an alkyl group containing from 1 to about 5 carbon atoms, an acetyl group, a —$Si(OR^5)_{3-y}R^6{}_y$ group: where y is an integer of 0, 1, 2, or 3; $R^5$ is independently selected from the group consisting of H, an alkyl group containing from 1 to about 5 carbon atoms, an acetyl group, and another —$Si(OR^5)_{3-y}R^6{}_y$ group; $R^6$ is independently selected from the group consisting of H, an alkyl group, a functionalized alkyl group, an alkene group, an aryl group, and an alkyl ether group, wherein $R^6$ comprises from 1 to about 10 carbon atoms when $R^1$ is not H.

76. The process of claim 69 wherein the carboxylic acid functional compound is represented by the formula $R^{12}(COOR^{13})_x$: where x is an integer of 1, 2, 3, or 4; $R^{12}$ is selected from the group consisting of H, an alkyl group, a functionalized alkyl group, an alkene group, a multivalent saturated hydrocarbon group, an aryl group, a functionalized aryl group, and an alkyl ether group, wherein $R^{12}$ comprises from 1 to about 10 carbon atoms when $R^{12}$ is not H; $R^{13}$ is independently selected from the group consisting of H, a formyl group, a carbonyl group, or an acyl group, wherein the acyl group can be functionalized with an alkyl group, a functionalized alkyl group, an alkene group, an aryl, a functionalized aryl group, and an alkyl ether group, wherein $R^{13}$ comprises from 1 to about 10 carbon atoms when $R^{13}$ is not H.

77. The process of claim 69 wherein the amount of water present in the aqueous-organic solvent mixture is an amount sufficient to provide a substantially homogeneous mixture of hydrolysis products and partial condensates of the epoxy functional silane and the disilane.

78. The process of claim 77 wherein at least a portion of the solvent component of the aqueous-organic solvent mixture is generated during the hydrolysis of the epoxy functional silane and the disilane.

79. The process of claim 77 wherein the aqueous-organic solvent mixture further comprises an effective amount of co-hydrolysis catalyst to enhance the hydrolysis rates of the hydrolyzable components.

80. The process of claim 69 wherein the aqueous-organic solvent mixture further comprises an effective amount of a catalyst to provide enhanced abrasion resistance to a coating produced by curing the composition.

81. The process of claim 80 wherein the effective amount of the catalyst is from about 0.1 to about 10 weight percent based on the total solids of the composition.

82. The process of claim 69 wherein the aqueous-organic solvent mixture further comprises an effective amount of a leveling agent to spread the aqueous-organic solvent mixture on the substrate and provide substantially uniform contact of the aqueous-organic solvent mixture with the substrate.

83. The process of claim 69 wherein the aqueous-organic solvent mixture further comprises form about 0.1 to about 50 weight percent, based on the total solids of the composition, of a mixture of hydrolysis products and partial condensates of a silane additive represented by the formula $R^{14}{}_xSi(OR^5)_{4-x}$: where x in an integer of 0, 1, 2, or 3; $R^{14}$ is independently selected from the group consisting of H, an alkyl group containing from 1 to about 10 carbon atoms, a functionalized alkyl group, an alkene group, an aryl group, and an alkyl ether group; and $R^{15}$ is independently selected from the group consisting of H, an alkyl group containing from 1 to about 10 carbon atoms, and an acetyl group.

84. The process of claim 83 wherein the amount of water present in the aqueous-organic solvent mixture is an amount sufficient to provide a substantially homogeneous mixture of hydrolysis products and partial condensates of the epoxy functional silane, the disilane, and the silane additive.

85. The process of claim 84 wherein at least a portion of the solvent component of the aqueous-organic solvent mixture is generated during the hydrolysis of the epoxy functional silane and the disilane.

86. The process of claim 84 wherein the aqueous-organic solvent mixture further comprises an effective amount of co-hydrolysis catalyst to enhance the hydrolysis rates of the silane components.

87. The process of claim 84 wherein the aqueous-organic solvent mixture further comprises an effective amount of a catalyst to provide enhanced abrasion resistance to a coating produced by curing the composition.

88. The process of claim 87 wherein the effective amount of the catalyst is from about 0.1 to about 10 weight percent based on the total solids of the composition.

89. The composition of claim 69 wherein the aqueous-organic solvent mixture further comprises an effective amount of a leveling agent to spread the aqueous-organic solvent mixture on the substrate and provide substantially uniform contact of the aqueous-organic solvent mixture with the substrate.

90. The process of claim 69 wherein the aqueous-organic solvent mixture further comprises an effective amount of colloidal silica to provide the composition with from about 0.1 to about 50 weight percent silica, based on the total of solids present in the composition.

91. The process of claim 90 wherein the amount of water present in the aqueous-organic solvent mixture is an amount sufficient to provide a substantially homogeneous mixture of the colloidal silica and the hydrolysis products and partial condensates of the epoxy functional silane and the disilane.

92. The process of claim 91 wherein at least a portion of the solvent component of the aqueous-organic solvent mixture is generated during the hydrolysis of the epoxy functional silane and the disilane.

93. The process of claim 92 wherein the aqueous-organic solvent mixture further comprises an effective amount of a catalyst to provide enhanced abrasion resistance to the coating produced by curing the aqueous-organic solvent mixture.

94. The process of claim 93 wherein the effective amount of catalyst present in the aqueous-organic solvent mixture is from about 0.1 to about 10 weight percent, based on the total solids of the aqueous-organic solvent mixture.

95. The process claim 90 wherein the aqueous-organic solvent mixture further comprises an effective amount of a leveling agent to spread the aqueous-organic solvent mixture on the substrate and provide substantially uniform contact of the aqueous-organic solvent mixture with the substrate.

96. The process of claim 69 wherein the aqueous-organic solvent mixture comprises: from about 0.1 to about 50 weight percent, based on the total solids of the composition, of a mixture of hydrolysis product and partial condensates of a silane additive represented by the formula $R^{14}_x Si(OR^5)_{4-x}$: where x is an integer of 0, 1, 2, or 3; $R^{14}$ is independently selected from the group consisting of H, an alkyl group containing from 1 to about 10 carbon atoms, a functionalized alkyl group, an alkene group, an aryl group, and an alkyl ether group; $R^{15}$ is independently selected from group consisting of H, an alkyl group containing from 1 to about 10 carbon atoms, and an acetyl group; and an effective amount of colloidal silica to provide the composition with from about 0.1 to about 50 weight percent silica, based on the total of solids present in the composition.

97. The process of claim 96 wherein the amount of water present in the aqueous-organic solvent mixture is an amount sufficient to provide a substantially homogeneous mixture of hydrolysis products and partial condensates of the epoxy functional silane, disilane, and silane additive.

98. The process of claim 97 wherein at least a portion of the solvent component of the aqueous-organic solvent mixture is generated during the hydrolysis of the epoxy functional silane the disilane, and the silane additive.

99. The process of claim 98 wherein the aqueous-organic solvent mixture further comprises an effective amount of co-hydrolysis catalyst to enhance the hydrolysis rates of the hydrolyzable components.

100. The process of claim 99 wherein the aqueous-organic solvent mixture further comprises an effective amount of a catalyst to provide enhanced abrasion resistance to the coating produced by curing the aqueous solvent mixture.

101. The process of claim 100 wherein the effective amount of catalyst present in the aqueous-organic solvent mixture is from about 0.1 to about 10 weight percent, based on the total solids of the aqueous-organic solvent mixture.

102. The process of claim 96 wherein the aqueous-organic solvent mixture further comprises an effective amount of a leveling agent to spread the aqueous-organic solvent mixture on the substrate and provide substantially uniform contact of the aqueous-organic solvent mixture with the substrate.

* * * * *

UNITED STATES PATENT AND TRADEMARK OFFICE
CERTIFICATE OF CORRECTION

PATENT NO.    : 6,348,269 B1
DATED         : February 19, 2002
INVENTOR(S)   : Karl W. Terry It is certified that error appears in the above-identified patent and that said Letters Patent is hereby corrected as shown below:

Column 19,
Line 21, in the formula "$Si(OR^5)_{3-y}R^6_y$" add -- – -- at the beginning of formula so it reads -- –$Si(OR^5)_{3-y}R^6_y$ --.

Column 20,
Line 5, the word "form" should be -- from --.
Line 9, the word "in" should be -- is --.

Signed and Sealed this

Eleventh Day of November, 2003

JAMES E. ROGAN
*Director of the United States Patent and Trademark Office*